(12) United States Patent
Yasukawa et al.

(10) Patent No.: US 8,004,957 B2
(45) Date of Patent: Aug. 23, 2011

(54) RECORDING AND REPRODUCING METHOD AND RECORDING AND REPRODUCING APPARATUS

(75) Inventors: Takakiyo Yasukawa, Fujisawa (JP); Koichi Watanabe, Hachioji (JP); Koichiro Nishimura, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 552 days.

(21) Appl. No.: 11/751,753

(22) Filed: May 22, 2007

(65) Prior Publication Data
US 2008/0137520 A1    Jun. 12, 2008

(30) Foreign Application Priority Data

Dec. 7, 2006 (JP) ................................. 2006-330109

(51) Int. Cl.
*G11B 7/00* (2006.01)
*G11B 20/10* (2006.01)
*G11B 5/09* (2006.01)

(52) U.S. Cl. ...... 369/116; 369/47.5; 369/59.1; 369/59.2

(58) Field of Classification Search ................. 369/116, 369/13.26, 59.2, 47.5, 59.1
See application file for complete search history.

(56) References Cited

U.S. PATENT DOCUMENTS

| | | | | |
|---|---|---|---|---|
| 5,949,747 | A * | 9/1999 | Miyashita et al. | 369/53.26 |
| 2004/0095862 | A1 * | 5/2004 | Nakajima et al. | 369/47.28 |
| 2004/0100885 | A1 | 5/2004 | Nakamura et al. | |
| 2004/0160874 | A1 * | 8/2004 | Hwang et al. | 369/47.53 |
| 2004/0248036 | A1 * | 12/2004 | Ohno et al. | 430/270.13 |
| 2004/0252617 | A1 * | 12/2004 | Kitagaki et al. | 369/59.11 |
| 2005/0013229 | A1 * | 1/2005 | Yokoi | 369/59.12 |

FOREIGN PATENT DOCUMENTS

| | | |
|---|---|---|
| CN | 1502099 | 6/2004 |
| CN | 1524264 | 8/2004 |
| JP | 10-320777 | 12/1998 |
| JP | 2005-353280 | 12/2005 |
| JP | 2006-120208 | 5/2006 |
| JP | 2006-172667 | 6/2006 |

OTHER PUBLICATIONS

Office Action issued in Japanese Patent Application No. 2006-330109 on Feb. 2, 2010.
Office Action issued in Chinese Patent Application No. 200710146619 on Nov. 6, 2009.

* cited by examiner

*Primary Examiner* — Craig A. Renner
*Assistant Examiner* — Aneeta Yodichkas
(74) *Attorney, Agent, or Firm* — Antonelli, Terry, Stout & Kraus, LLP.

(57) ABSTRACT

A recording and reproducing method has a recording pulse generating step of generating a recording pulse to set timing of a beam emitted from a laser according to data to be recorded on an information recording medium; a laser power control step of controlling a laser drive current according to a recording laser power; a beam detecting step of detecting a power of the beam emitted from the laser; a signal detecting step of detecting a signal level of a reproduction signal read out from the information recording medium; a step of binarizing the reproduction signal to generate a binarized signal; a step of generating a data signal synchronized with a reference clock signal with use of the binarized signal; and a step of detecting a shift in time interval between the binarized signal and the reference clock signal and feeding the shift back to the recording pulse.

21 Claims, 9 Drawing Sheets

RECORDING AND REPRODUCING METHOD AND RECORDING AND REPRODUCING APPARATUS

INCORPORATION BY REFERENCE

The present invention claims priority from Japanese application JP 2006-330109 filed on Dec. 7, 2006, the content of which is hereby incorporated by reference into this application.

BACKGROUND OF THE INVENTION

The present invention relates to a recording and reproducing apparatus and a recording and reproducing method for recording information on an information recording medium with use of a semiconductor laser.

Information recording is carried out on various types of optical discs. Only once writable optical discs include CD-R, DVD-R, DVD+R, and BD-R. Several-times-writable optical discs include CD-RW, DVD-RAM, DVD-RW, DVD+RW, and BD-RE.

In the technical development of optical disc recording and reproducing apparatuses, the wavelength of a semiconductor laser has been made short and the recording film characteristic of an optical disc as a recording medium has been improved. Through such technical development, data of 25 GB per layer in the recording film of the disc can be recorded on the disc in a BD (Blu-ray Disc) system using a blue laser. In the BD system, a modulation system using the shortest mark length of 2T is employed as a data modulation system.

As techniques relating to a recording and reproducing method, a technique relating to recording waveform is known, for example, in JP-A-2005-35328, and a technique relating to recording power is known, for example, in JP-A-2006-172667.

SUMMARY OF THE INVENTION

FIG. 13 shows an example of a multi-pulse type recording waveform of a rewritable disc BD-RE (Blu-ray Recordable). Reference symbol CLK denotes a recording frequency as a reference, and symbol NRZ denotes the length of a recording data string. In the case of 2T, for example, a recording mark having a length corresponding to twice a recording frequency T is formed. Similarly, in the case of 3T, a recording mark has a length of 3T corresponding to 3 times the recording frequency T.

In FIG. 13, recording waveforms for respective nT (n: integer) should be shown. However, since similar recording waveforms are repeated, recording waveforms for 4T, 6T and more are omitted. These recording waveforms have similar shapes. That is, each recording waveform has a recording power Pw for providing a thermal change for recording, an erasing power Pe for returning to an amorphous state as an unrecorded state through slow thermal change, and a bottom power Pb for shielding heat, as laser powers to be applied on a recording film With respect to a BD-R disc writable only once, however, a laser power called a space power Ps corresponding to the erasing power of the rewritable BD-RE disc is used for the purpose of supplementally providing heat. In the recording waveform of FIG. 13, heat accumulation can be suppressed by alternately switching between the recording power Pw and the bottom power Pb at intervals of the period of the recording frequency.

FIG. 14 shows an example of a castle type recording waveform for a BD-R disc writable only once. The recording waveform has a basic structure substantially similar to that of FIG. 13. The format of FIG. 14 is used for a recording waveform, in particular, when it is desired to record information on a BD disc at a high speed.

Since such a recording waveform as shown in FIG. 13 cannot sufficiently follow up the response of the laser, a stable recording power cannot be applied with the recording pulse signal having a period of the recording frequency T. Thus the recording waveform is unsuitable for high speed recording. However, when the characteristics of the laser and the mounted circuit are improved, such a multi-pulse type recording waveform as shown in FIG. 13 is considered to be used even for high speed recording.

In the recording control of an optical disc based on the heat control, when the shortest space is made shorter and when a target recording mark is formed, the thermal influence of a recording mark already formed earlier by one on the target recording mark to be next formed cannot be ignored. Such a phenomenon holds true even for a recording mark later by one. For this reason, in order to increase an accuracy, it becomes necessary for the recording waveform for formation of the target recording mark to consider not only the length of the target recording mark but also the influences of the preceding and succeeding space lengths.

Drives or discs vary in quality from one drive to another or from one disc to another, and a recording performance is degraded by a combination of such variation factors. In particular, as a recording density increases, such an influence becomes more remarkable.

Optical discs as recording media have fluctuation factors including variations in the thickness of a cover layer and the thickness of a recording film and in sensitivity, and variations within one turn of the disc and variations between inner and outer peripheries thereof. Similarly, even in a recording and reproducing apparatus, since the apparatus is made up of various kinds of many components, the influences of variations in characteristic among the components cannot be ignored. Moreover, since the number of components is reduced for cost reduction, it becomes more difficult to stably secure the intended recording and reproducing performances.

For the purpose of obtaining stable recording and reproducing operation, considering such variation factors, optical disc recording and reproducing apparatuses are equipped with an adjusting function of performing various types of adjustments to suppress the performance degradation of the disc and the recording and reproducing apparatuses caused by variations.

In optical disc recording and reproducing apparatuses, for in particular electrical variation factors, the adjusting function has been relatively widely employed. With regard to the recording waveform, however, consideration is taken only to results obtained based on verification of the apparatus before shipping, and thus it is hard to obtain a sufficient recording performance.

JP-A-2006-172667 suggests several calibration systems for recording power. However, the accuracies of the calibration systems depend on the detection accuracy of the recording and reproducing apparatus, and also easily influenced by an ambient environment such as temperature.

In this way, the prior art information recording and reproducing apparatuses cannot secure, in some cases, a reliable recording performance due to variations among information recording media and variations among components in the recording and reproducing apparatus.

In view of the above problems, it is therefore an object of the present invention to provide a recording and reproducing method and a recording and reproducing apparatus which can derive conditions to efficiently record data through simple simulation write while considering the influences of variations among recording media and variations among recording and reproducing apparatuses.

The above object is attained, for example, by inventions set forth in Claims.

Other objects, features and advantages of the invention will become apparent from the following description of the embodiments of the invention taken in conjunction with the accompanying drawings.

DESCRIPTION OF THE EMBODIMENTS

A recording and reproducing method and a recording and reproducing apparatus in accordance with an embodiment of the present invention will be explained.

A recording and reproducing apparatus in accordance with an embodiment includes a recording pulse generating means for setting beam emission timing according to data to be recorded on an information recording medium, a laser power control means for controlling a laser driving current according to a recording laser power, and a beam detecting device for detecting the power of a beam emitted from a laser. A means for reproducing a signal read out from the information recording medium has a means for detecting the signal level of a reproduction signal, a means for binarizing the reproduction signal, a means for generating a data signal synchronized with a reference clock signal for the information with use of the binarized signal, and a means for measuring a shift in time interval between the binarized signal and the reference clock signal.

The laser power control means can switch stepwise between a plurality of laser powers. The plurality of laser powers include at least one of a recording power, an erasing power, an middle power, and a space power.

A step of recording information on a rewritable information recording medium by changing stepwise the erasing power includes a method of recording the information at least twice for the same area.

The step of recording information on a rewritable information recording medium by changing stepwise the erasing power includes a step of recording the information with use of the erasing power for the second recording smaller than the erasing power for the first recording.

In a multi-pulse type recording control method, recording power scan is again carried out in such a manner that a change in the width of the multi-pulse is independent of the detection of a modulation degree.

In a castle type recording control method, the recording power scan is again carried out in such a manner that a change in the middle power is independent of the detection of the modulation degree.

In a procedure of determining the recording power, the recording power is first determined and the erasing power and the space power are finally determined.

Embodiments of the present invention will be detailed with reference to the accompanying drawings.

[Apparatus Arrangement and Evaluation Index]

Figure 1:
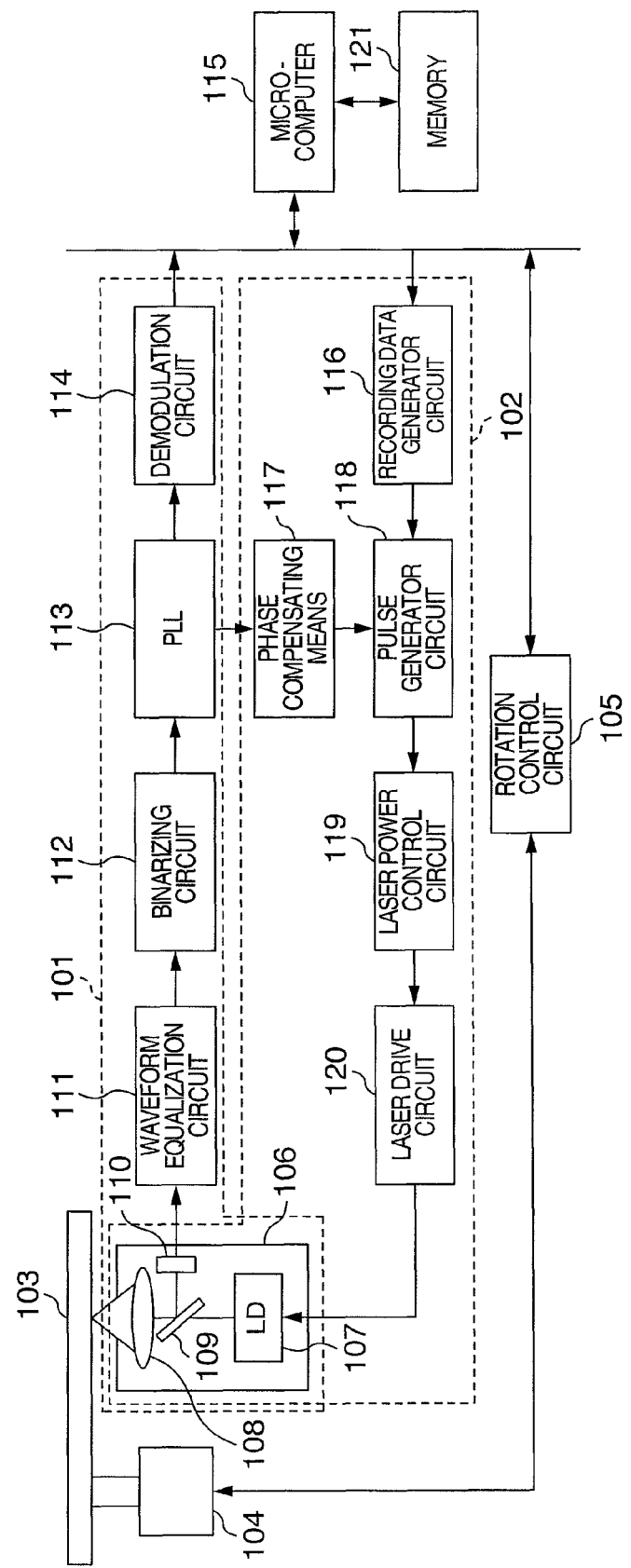
FIG. 1 is a block diagram of a recording and reproducing apparatus.

FIG. 1 shows a recording and reproducing apparatus in accordance with an embodiment 1 of the present invention. The recording and reproducing apparatus includes a reproduction signal processor 101 and a recording signal processor 102. An information recording medium 103, to and from which information is written or read out, is fixed to a spindle motor 104, so that the rotation of the medium is adjusted at a desired rotational speed according to an access-target site on the medium under control of a rotation control circuit 105. Explanation will be made assuming that the information recording medium is an optical disc.

An optical pickup 106 is provided for shared use by the reproduction signal processor 101 and the recording signal processor 102. The optical pickup 106 is made up of a semiconductor laser (LD) 107, a condensing lens 108, a beam splitter 109, and an optical detector 110.

In this connection, although the optical pickup has been commonly used for both of reproduction and recording, separated optical pickups may be used therefor.

The reproduction signal processor 101 is made up of the optical pickup 106, a waveform equalization circuit 111, a binarizing circuit 112, a PLL (Phase Lock Loop) 113, and a demodulation circuit 114.

A signal read out from the information recording medium 103 is sent through the condensing lens 108 and the beam splitter 109 to the optical detector 110, where the signal is converted to an electric signal and then output therefrom. The electric signal is applied to the waveform equalization circuit 111. In the waveform equalization circuit 111, for the purpose of AC coupling, the level adjustment of the signal amplitude, and noise removal, signal components having a desired frequency band in the input signal are emphasized to efficiently obtain the signal components.

Thereafter, in the binarizing circuit 112, the input signal is binarized with use of an average value of the signal level as a reference (slice level). The binarized signal thus obtained is synchronized with the a reproduction clock for timing correction at the PLL 113.

When a PRML (Partial Response Maximum Likelihood) system is used as a system of processing a signal having a low SNR (Signal-to-Noise Ratio), the waveform equalization circuit 111 is used as a preamplifying function and the binarizing circuit 112 samples a data string of the reproduction signal at intervals of the period of the clock. Acquisition timings are different, but even in this case, the reproduction signal can similarly be evaluated with use of a time axis as a reference.

Since the recording and reproducing apparatus is controlled by a microcomputer 115, the information reading and writing can be controlled in the respective blocks under control of the microcomputer based on a host computer.

The recording signal processor has a recording data generator circuit 116, a phase compensating means 117, a pulse generator circuit 118, a laser power control circuit 119, a laser drive circuit 120, and the optical pickup 106.

In the recording data generator circuit 116, the recording data string is modulated according to the modulation system of the recording and reproducing apparatus.

The phase compensating means 117 is arranged to detect the phase state of the reproduction signal, compare it with a length corresponding to twice the data length of a reference value (reference clock T), and feed a difference from a reproduced result back.

The pulse generator circuit 118 generates a recording pulse waveform according to the information recording medium in the recording and reproducing apparatus. When the information recording medium is an optical disc, in particular, a code indicative of a suitable recording pulse is recorded in the disc as management information on the information recording medium. Upon generation of the recording pulse, the recording pulse may be generated from the recording pulse code, or a recording pulse previously adjusted or fixed uniquely by the recording and reproducing apparatus may be used as the recording power.

In the laser power control circuit 119, the laser power is set and controlled according to the levels of the recording pulses generated in the pulse generator circuit 118. Similarly to the pulse waveform, the laser power may be generated from the code recorded on the information recording medium, or a recording power previously adjusted or fixed uniquely by the recording and reproducing apparatus may be used as the laser power.

The pulse generator circuit 118 and the laser power control circuit 119 have such values as mentioned above as initial values. The PLL 113 and the phase compensating means 117 compensate for the detected phase difference with use of the pulse width or laser power as a parameter.

The laser drive circuit 120 drives the semiconductor laser 107 to set the previously-set laser pulse width and laser power.

Through the aforementioned operation of the recording signal processor 102, an access is made to a site having data recorded in predetermined conditions, a reproduction signal is acquired from the site by the reproduction signal processor 101, the difference of the recording mark edges are fed back to the recording signal processor 102 to derive suitable recording conditions.

In this connection, the microcomputer 115 may previously store necessary information if necessary in a memory 121. For example, information about characteristics of a specific recording information medium may be previously stored in the memory.

Figure 2:
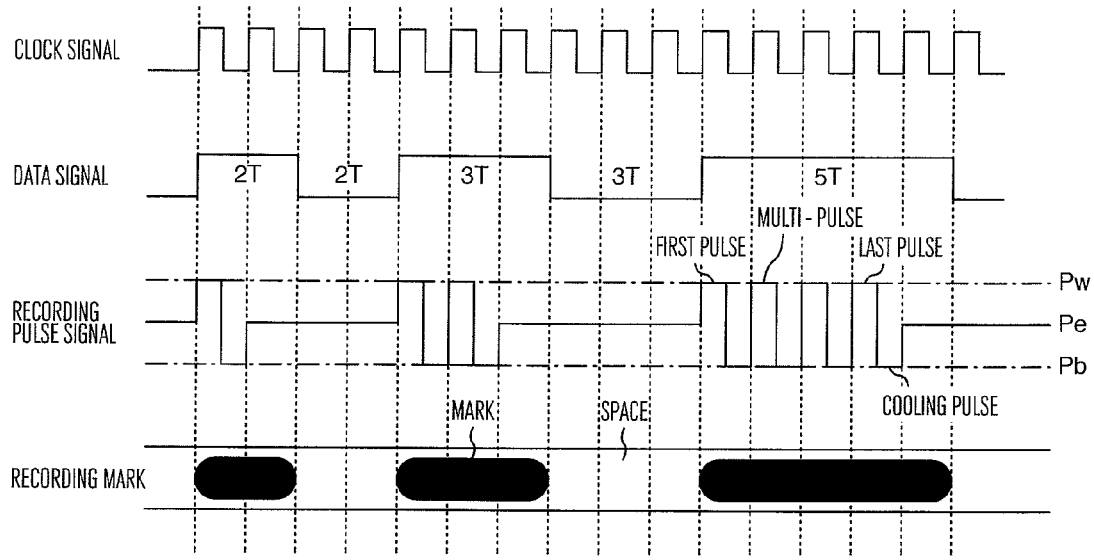
FIG. 2 shows a relationship among a data signal, a recording pulse signal, and a recording mark for data recording.

FIG. 2 shows, as an example, a relationship among a recording data signal, a recording pulse signal, and a recording mark in the embodiment of the present invention.

Although all the signals show basically the same position state, all events will not occur at the same time as a matter of course. First, a clock signal as a reference is shown in the uppermost stage of the drawing. The recording data generator circuit 116 in FIG. 1 generates a recording data signal from an information signal received therein with the clock signal as the reference.

Subsequently, the pulse generator circuit 118 in FIG. 1 generates a recording pulse waveform signal according to each data signal. For each recording mark, pulses in the pulse signal are classified into 4 types of pulses, that is, first pulse, multi-pulse, last pulse, and cooling pulse.

The first pulse is a pulse located at the head of the recording mark. The laser power control circuit 119 allocates a recording power Pw to the first pulse. The head position of the recording mark is controlled by the first pulse.

Subsequently, the recording power Pw and the bottom power Pb are alternately allocated to the multi-pulse at intervals of the period of the clock frequency. The multi-pulse acts to effectively shield heat in such a manner that the recording mark is stably formed by the first pulse.

Next, the last pulse is located at the last stage of the recording mark. The laser power is controlled to determined the last position of the recording mark. Similarly to the first pulse and the multi-pulse, the recording power Pw is allocated to the last pulse as the recording power.

Finally, the bottom power Pb is allocated to the cooling pulse. Since the heat energy applied by the last pulse is shielded by the cooling pulse, the terminating end of the recording mark can be effectively formed.

The length of the data signal can be controlled by adjusting the number of pulses in the multi-pulse according to the length of the recording mark. Then the multi-pulse is not used for 3T and the multi-pulse and the laser pulse are not used for 2T. An example of 2T, 3T and 5T has been shown in FIG. 2.

More specifically, in a 4T mark having one multi-pulse, and the relationship between the recording mark length and the recording pulse can be controlled by incrementing the number of pulses in the multi-pulse successively by one as the mark length 1T increases.

As has been explained above, through the laser power control circuit 119 and the laser drive circuit 120, a suitable laser power is applied to the information recording medium so that such recording marks as shown in the lowermost stage of the drawing are formed.

Explanation will next made as to the processing of a reproduction signal for use in an evaluation index.

Figure 3:
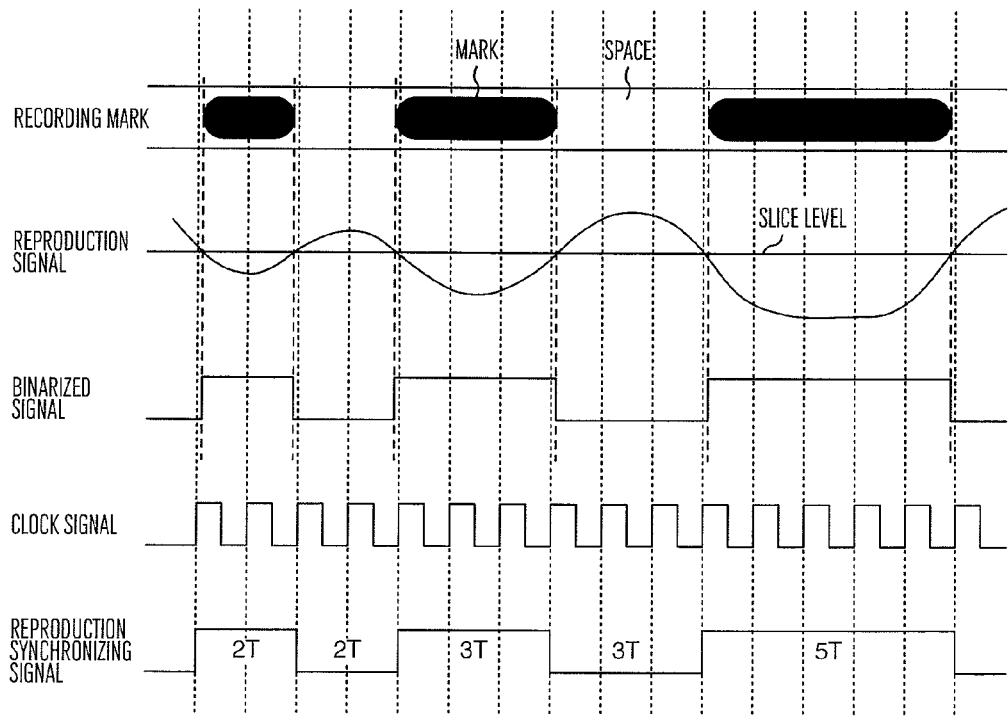
FIG. 3 shows a relationship among a recording mark, its reproduction signal, a binarized signal, a clock signal, and reproduction synchronizing signal for data reproduction.

FIG. 3 is an example of data reproduction, showing recording marks on an information recording medium, a reproduction signal in the waveform equalization circuit 111 when the recording marks are reproduced, a binarized signal in the binarizing circuit 112, a clock signal as a reference, and a reproduction synchronizing signal synchronized by a clock signal.

Similarly to FIG. 2, all the signals show basically the same position state.

The reproduction signal is a signal obtained when the marks on the information recording medium are reproduced, and shows a state after subjected to wave equalization by the waveform equalization circuit 111.

The binarized signal is generated by slicing the reproduction signal with a slice level at the binarizing circuit 112.

The clock signal is a reference clock signal generated at the PLL 113 from the binarized signal.

The reproduction synchronizing signal is obtained when the binarized signal is synchronized by the clock signal, and contains a data string conforming to the modulation system determined according to the system of the information recording medium.

In the present invention, mark shift information as one of evaluation indexes of determining recording conditions uses a phase difference relation between the binarized signal and the reproduction synchronizing signal.

The mark shift information is evaluated as a relative positional shift between the recording marks and a shift of the recording mark length to a reference length on the basis of the reproduction signal read out from the information recording medium with use of a result after subjected to wave equalization. A standard deviation of these shifts is called a jitter which is used as an evaluation index of the recording performance. The smaller the value of the jitter is the lower the error possibility is. Thus, change parameters are adjusted so that the jitter index has a smaller value.

Figure 4:
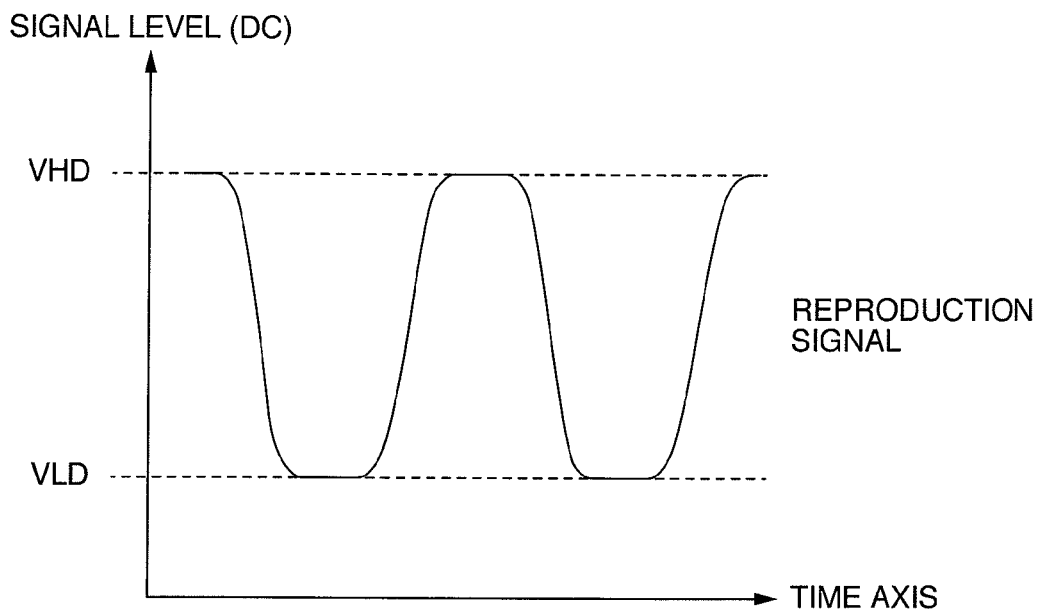
FIG. 4 shows a signal level DC obtained from the reproduction signal.

Next, an evaluation index relating to the signal level of the reproduction signal will be explained. Evaluation indexes include a modulation degree MOD and a beta BETA. Explanation will first be made as to the modulation. FIG. 4 shows a result of a reproduction signal when obtained by slicing a signal level DC. Assuming that the reproduction signal has an upper level VHD and a lower level VLD, then the modulation MODE is calculated according to an equation which follows.

$$MOD=(VHD-VLD)/VHD$$

The MOD can be regarded as a parameter having a correlation with a recording power according to the characteristics of a recording film of an optical disc.

Figure 5:
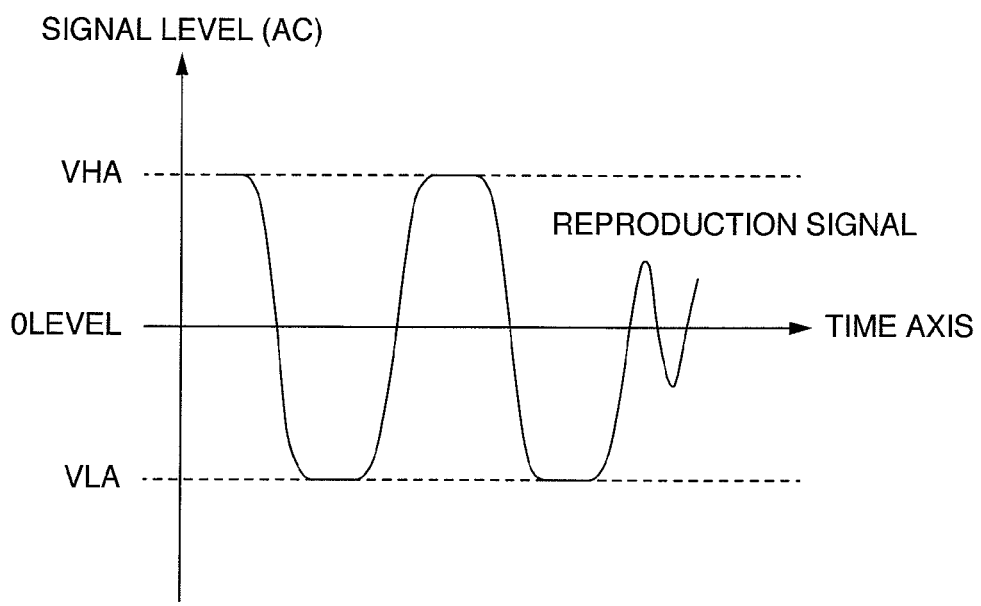
FIG. 5 shows a signal level AC obtained from the reproduction signal.

Explanation will next be made as to the beta. FIG. 5 shows a result of a reproduction signal when obtained with a signal level AC. It is assumed as in FIG. 4 that the reproduction signal has an upper level VHA and a lower level VLA. Since the reproduction signal is obtained by slicing the signal level AC, the lower level VLA is a minus value. Then the beta BETA is calculated according to an equation which follows.

$$BETA=(VHA+VLA)/(VHA-VLA)$$

Similarly to the modulation degree MOD, the beta BETA can also be regarded as a parameter having a correlation with the recording power according to the characteristics of the recording film of the optical disc.

The positional displacement (which will be referred to as the shift, hereinafter) of a recording mark, the jitter, the modulation degree, and the beta are used as mark evaluation indexes.

Embodiment 1

Figure 6:
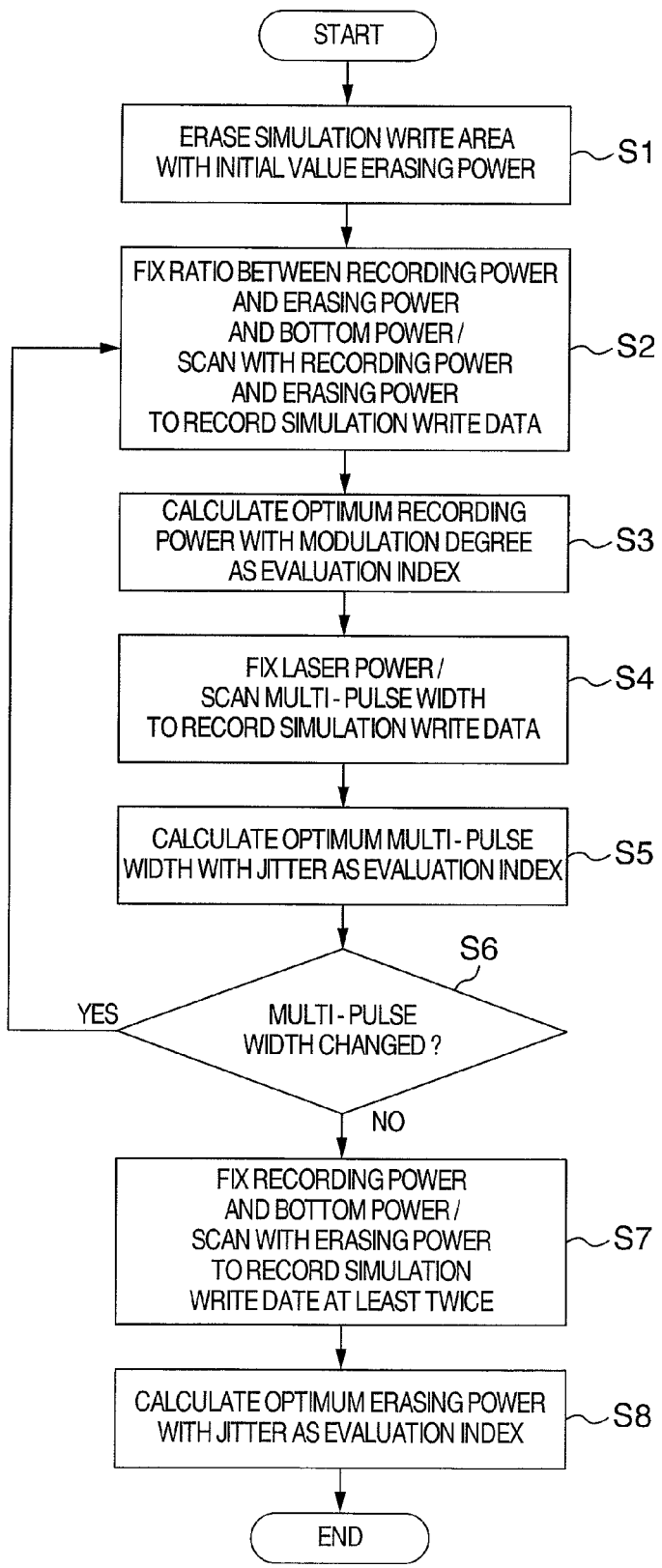
FIG. 6 is a flow chart showing the operation of a first embodiment.

FIG. 6 shows a flow chart of the operation of an embodiment 1 of the present invention. In the present embodiment, explanation will be made on the assumption that a multi-pulse type recording waveform is used for a rewritable optical disc (which is abbreviated to BD-RE, hereinafter).

First of all, an area to be subjected to simulation write is erased with an initial power having an initial level (step S1). When a rewritable disc is recorded or erased even with the same recording power, the recorded or erased disc cannot have always exactly the same condition as the disc before recorded or erased. In other words, the previously-recorded disc after recorded or erased cannot have always exactly the same condition as the otherwise disc after recorded or erased due to the influences of the incomplete erasing. For this reason, it is required to initially erase a use area to put the area in the same condition as an unwritten condition.

The step S1 has been put as the first step in the flow chart. However, when the step S1 is put as the subsequent steps for recording, operations similar to the step S1 may be carried out in the respective steps using an optimum erasing power or an initial-value erasing power.

Subsequently, in order to find a recording power, scanning is carried out with the recording power. Under conditions that a ratio between the recording power and the erasing power and a bottom power are fixed, scanning is carried out with the recording and erasing powers to record simulation write data (step S2).

In the next step S3, in order to detect a modulation degree, it is desirable to use only a pattern having a long recording mark length as a data pattern to be used for simulation write. When the amplitude of the scanning power and a step width are determined, the determination may be made based on a recording power as disc information written in the optical disc as a reference, or may be made based on a recording power stored in the memory of the recording and reproducing apparatus.

However, when data is recorded on an area in a disc with a high power and then data is again recorded on the same area with a lower power (which will be referred to as cross power overwrite, hereinafter), there occurs situations in some discs that the previously-recorded data with the high power cannot be sufficiently erased depending on their recording film characteristics of the discs, so that recording of data on the same area even with the same recording power results in that the recording performance of the area becomes unstable.

Assume for example that the recording power Pw as the reference of a recording disc is 5.0 mW, Pe/Pw=0.60, and Pb=0.3 mW. Then when the recording power is stepwise changed with a step of 0.2 mW in a range of from 2.0 mW to 4.0 mW as an example, the recording power can be derived without causing any deterioration of the disc. At this time, since Pe/Pw is fixed, it is obvious to change the erasing power from 1.2 mW to 2.4 mW according to a change in the recording power.

The number of steps in the power and the widths of the steps are determined by the recording and reproducing apparatus, and are not limited in the present invention.

When the power scanning is carried out in a range not exceeding the reference recording power, however, the recorded condition becomes different from the intended recorded condition and thus it is required to analogize an optimum recording power. To this end, in the third step, an optimum recording power is calculated as with use of the modulation degree as an evaluation index (step S3).

Figure 7:
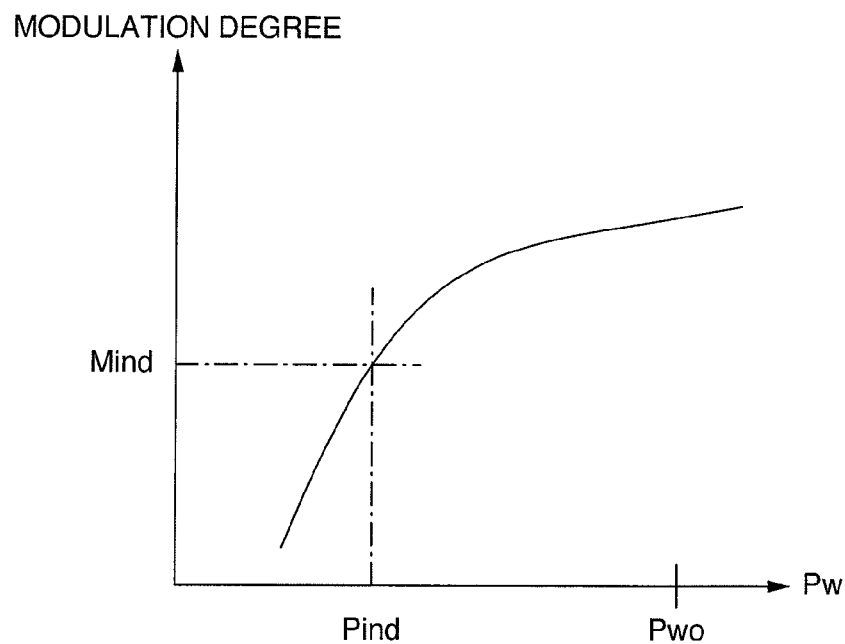
FIG. 7 shows a relationship between a recording power and a modulation degree.

How to calculate the optimum recording power is shown in FIG. 7. In the drawing, a horizontal axis is the recording power Pw and a vertical axis is the modulation degree MOD. The optimum recording power Pwo may be determined with use of the value of a recording power Pind of an index written as disc information about the disc as a reference, or a predetermined value previously stored in the memory may be employed as the optimum recording power.

Similarly, even a modulation degree Mind may be determined with use of a value written as disc information about the disc as a reference, or a predetermined value previously stored in the memory may be employed as the modulation degree Mind. Assuming that a recording power Pind2 is for the reference modulation degree Mind, then the optimum recording power Pwo is found according to an equation which follows.

$$Pwo=Pind2\times K$$

Where, K denotes a constant. Even the value of the constant may be determined with use of a value written in the disc as disc information about the disc as a reference, or a predetermined value previously stored in the memory may be used as the constant.

When the optimum recording power is included in the scan range, the recording power is stepwise changed from 4.0 mW to 6.0 mW with a step of 0.2 mW for recording as an example. Even in this case, the modulation degree or the jitter may be similarly used as an index.

Figure 8:
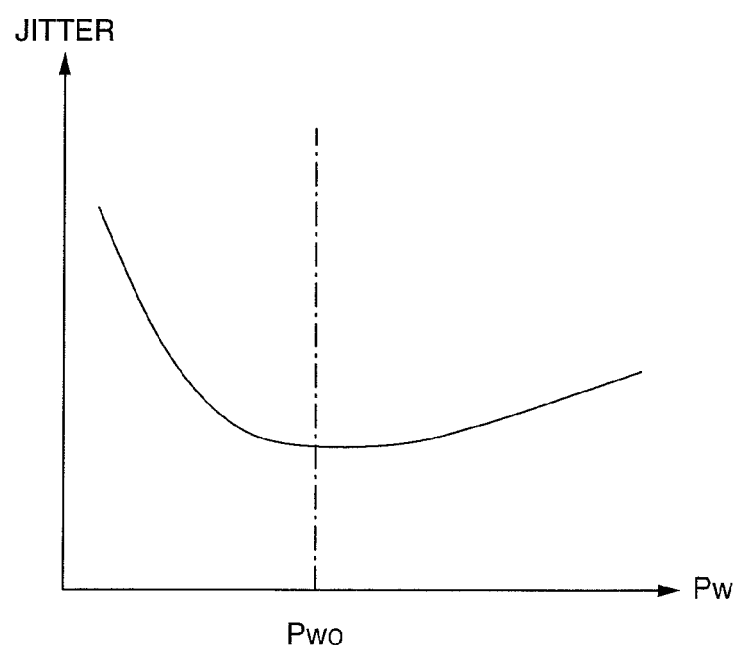
FIG. 8 shows a relationship between a recording power and a jitter.

FIG. 8 shows a relationship between the recording power and the jitter. When the recording power is scanned with levels higher or lower than the optimum value Pwo, analogizing is unnecessary. Thus the performance after the disc is actually recorded can be directly confirmed and be accurately found. When the recording power is adjusted with the recording power only below the recording power Pwo, however, since the recording performance cannot be directly confirmed, the jitter cannot be used as a direct index.

Subsequently in a next step, verification is made since the modulation degree depends on the formation condition of a recording mark having a long length. With regard to the laser power, all of the recording power, the erasing power, and the bottom power are previously fixed on the basis of a result found in the step S3. And by changing the width of multi-pulse, recording with the respective power steps is sequentially carried out (step S4).

Similarly to the recording power, information about parameters (pulse width, pulse position, etc.) of the recording pulse may use values written in the disc as disc information, or predetermined values previously stored in the memory may be used as the pulse parameters.

The step width of the multi-pulse depends on a laser driver used in the recording and reproducing apparatus. In this example, the step width is assumed to be capable of being controlled with an accuracy corresponding to 32 times the reference clock. However, the accuracy is not limited to this example in the present invention, as a matter of course.

For example, the multi-pulse width used as an initial value is assumed to be set at 12/32*T. Symbol T denotes a reference clock and is 7.57 ns in the case of double rate in a BD disc. In this case, the multi-pulse width is stepwise changed on a step-by-step basis in a range of, for example, from 8/32*T to 16/32*T. Smallest one of jitters as its result index is calculated as an optimum multi-pulse width (step S5).

Figure 9:
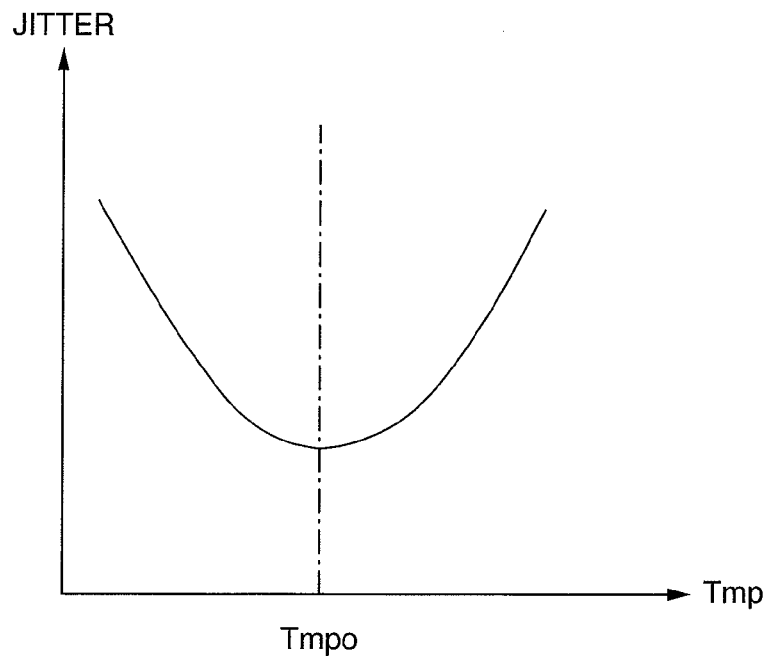
FIG. 9 shows a relationship between the width of a multi-pulse.

FIG. 9 shows a relationship between a multi-pulse width and a jitter. A multi-pulse width for a minimum jitter is used as an optimum multi-pulse width Tmpo. As the multi-pulse width is changed, a mark/space balance between the shortest mark length and the long mark length using the multi-pulse varies. For this reason, this causes variation of the slice levels for binarization, thus resulting in that a convergence point cannot be found.

For this reason, when a multi-pulse width calculated as the optimum multi-pulse width as a parameter in the step S5 is different from the multi-pulse width used in the step S2, there is a possibility that the calculation of the optimum recording power is changed by the multi-pulse width. To avoid this, the apparatus returns to the step S2 to again calculate an optimum recording power (step S6). When the apparatus determines no difference between the multi-pulse width and the evaluated result, the apparatus proceeds to a next step.

When the apparatus determines an accurate multi-pulse width in the step 5, the apparatus next scans the disc with the erasing power (step S7). Upon the scan with the erasing power, when the scan is carried out on the previously-recorded area of the disc, the recorded result may be different from the correct result depending on the condition of the previously-recorded area, as has been mentioned above. To avoid this, as has been done in the step S1, the recording area is erased with the optimum erasing power or with the initial-value erasing power.

Since it is necessary to also evaluate the performance of the erasing power in this step, the power scanning operation is carried out at least twice on the same simulation write area in the step S6. When the same area is recorded with the same recording power and the same erasing power, evaluation can be achieved, with the emphasized rewrite characteristic.

At the stage of the step S7, the recording power is already determined in the step S3. Thus a setting range of the erasing power is determined with use of the previously-found recording power as a reference. Assuming for example, that the erasing power determined in the step S3 is 4.0 mW, then the erasing power is stepwise changed in a range of, for example, from 3.0 mW to 5.0 mW with a step of 0.2 mW.

Figure 11:
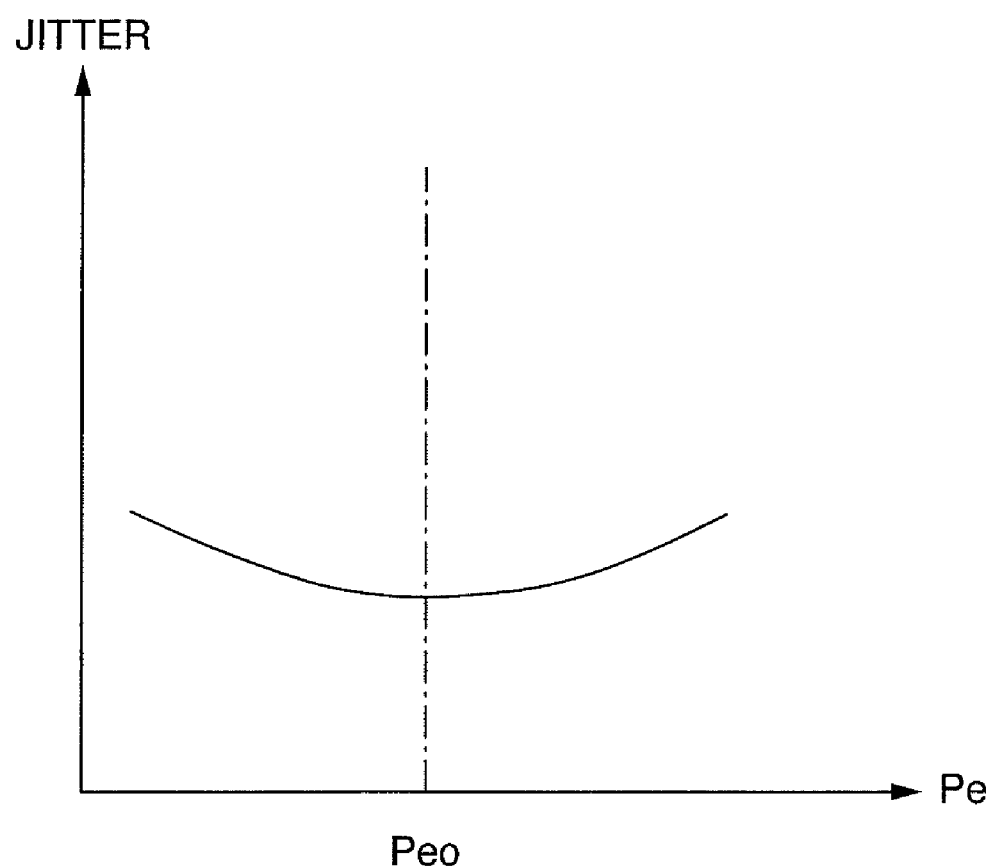
FIG. 11 shows a relationship between an erasing power and a jitter.

FIG. 11 shows a relationship between an erasing power and a jitter. When the jitter is at a minimum, the erasing power becomes an optimum erasing power Peo. The conditions of recording twice depending on the erasing power were set in this example. This is because the rewrite characteristic of the recording area cannot be correctly evaluated when the recording area was in an unrecorded condition before the erase power testing. For shortening a simulation write time, the rewrite conditions were set to be once. Once rewrite (twice rewrite) is considered to be enough for the performance evaluation. However, in the viewpoint of increasing the accuracy, the rewrite may be carried out many times beyond once or twice. In a step S8, the area recorded with the erasing power stepwise changed is reproduced to calculate an optimum erasing power with use of the jitter as an evaluating index.

Through the above method, the recording conditions can be optimized simply and efficiently.

Embodiment 2

Figure 12:
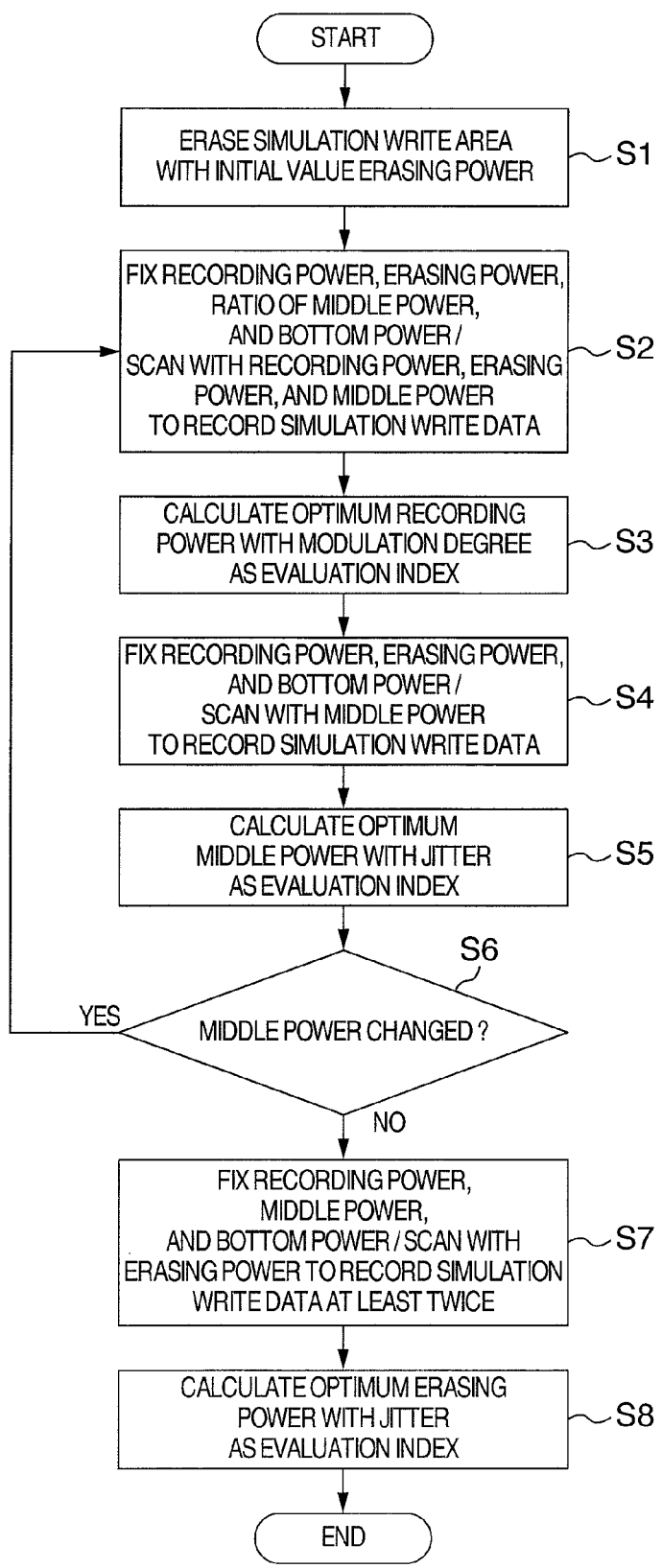
FIG. 12 is a flow chart showing the operation of a second embodiment.
Figure 13:
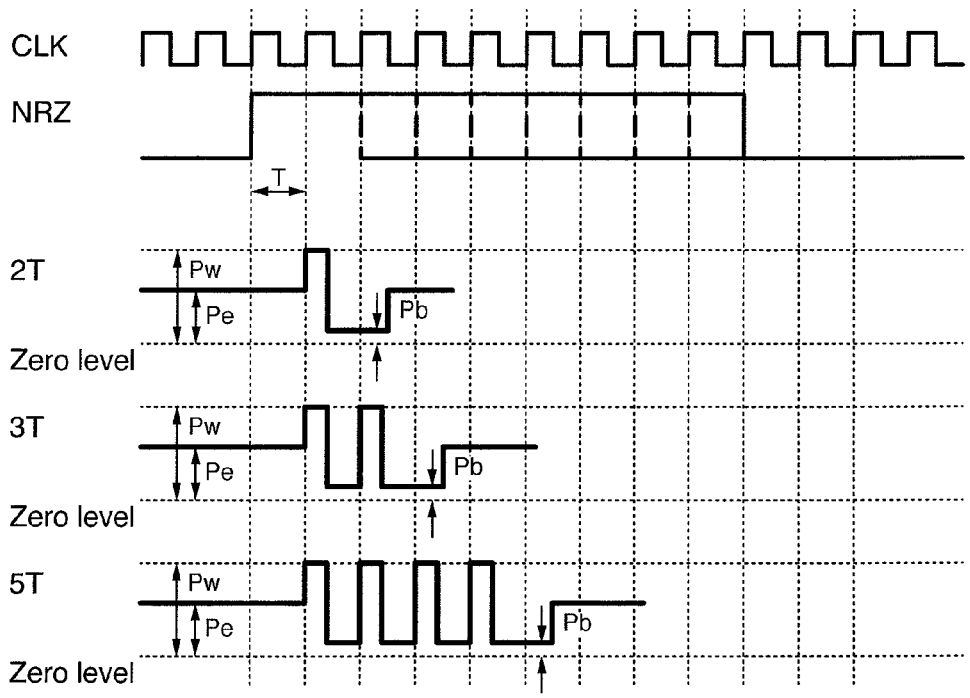
FIG. 13 shows an example of a multi-pulse type recording waveform.

FIG. 12 shows a flow chart for explaining the operation of an embodiment 2 of the present invention. The present embodiment will be explained on the assumption that a castle type recording waveform is used for a BD-RE disc.

The flow chart of the embodiment 2 of the present invention has a basic structure similar to FIG. 6. Thus steps similar to those in FIG. 12 are denoted by the same reference numerals as those in FIG. 6 and explanation thereof is omitted. First of all, the first step S1 is the same as in FIG. 6 and explanation thereof is omitted. In the castle type recording waveform, a relationship between a recording power and an middle power becomes an important factor for mark formation. For this reason, in the step S2, a relationship (ratio) of the recording power, the erasing power and the middle power are fixed. A bottom power may be set at such a level as to produce a stable output to an extent that the laser power does not vanish completely. And power scan is carried out with the recording power, the erasing power, and the middle power.

The operation of calculating an optimum recording power in the step S3 is also similar to in FIG. 6 and explanation thereof is omitted. In the step S4, the formation condition of a long recording mark is verified with use of the multi-pulse width as a parameter in the case of the multi-pulse type recording waveform. In the castle type recording waveform, a similar method can be estimated with the ratio of the middle power.

Figure 14:
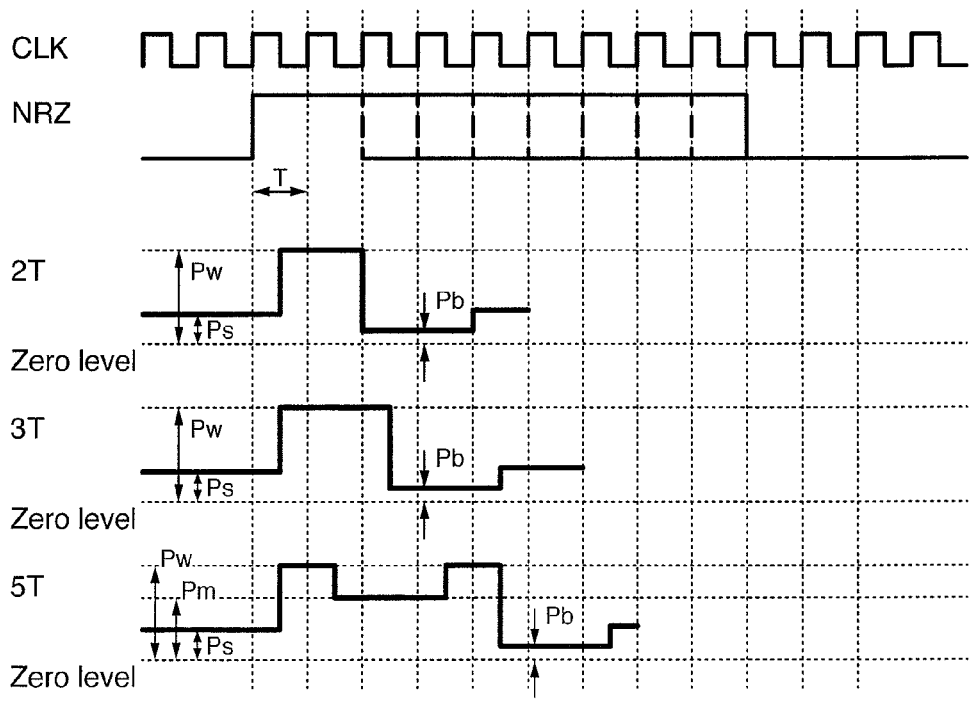
FIG. 14 shows an example of a cattle type recording waveform.

With respect to the laser power, the recording power, the erasing power, and the bottom power are all set at fixed values on the basis of a result found in the previous step S3. And by changing the middle power (Pm in FIG. 14), recording is sequentially carried out with the respective power steps (step S4).

Similarly to the multi-pulse type recording waveform, information about the parameters (pulse width, pulse position, etc.) of the recording pulse signal may be set at values written in the disc as disc information, or may be set at predetermined values previously stored in the memory.

It is assumed for example that 8 mW is used as the recording power of the castle type recording waveform and 6.5 mW is used as the middle power Pm as initial values. At this time, the middle power Pm is stepwise changed with a power step of 0.2 mW in a range of from 5.5 mW to 7.5 mW. As a result, an middle power when the jitter as an index has a smallest value is calculated as an optimum middle power (step S5).

Figure 10:
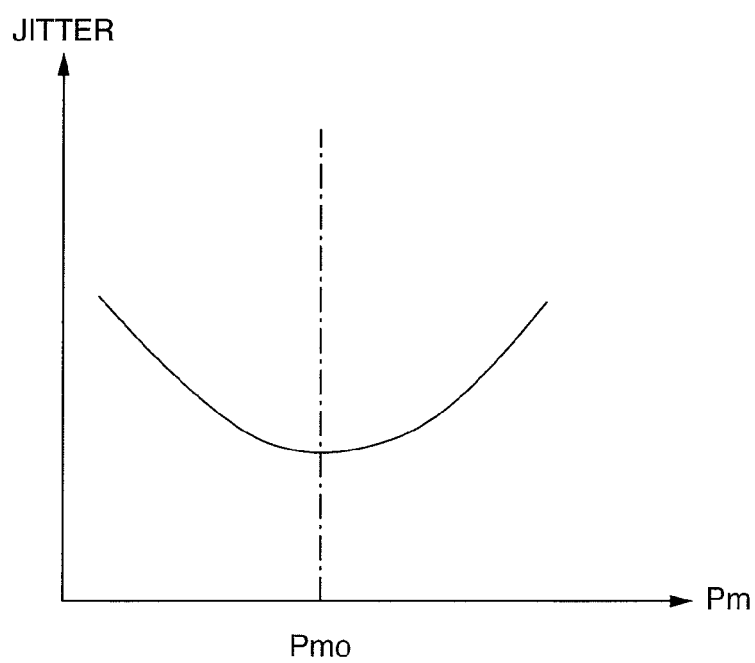
FIG. 10 shows a relationship between an middle power and a jitter.

FIG. 10 shows a relationship between the middle power Pm and a jitter. A middle power when the jitter has a minimum value is an optimum middle power Pmo. As the middle power Pm is varied, a mark/space balance between the shortest mark length and a long mark length using the middle power Pm varies. For this reason, the slice levels for binarization are changed and the optimum point cannot be found.

When the optimum value result of the middle power Pm as a parameter (in the step S5) is different from the middle power Pm used in the step S2, there is a possibility that the calculation of the optimum recording power was changed by the middle power Pm. Therefore, the procedure returns to the step S2 to again calculate the optimum recording power. When the apparatus determines to find no difference between the middle powers as the evaluation result, the apparatus proceeds to the next step.

In the step S7, as in the step S2, the middle power is considered as one of the parameters of the recording power and power scan is carried out with the erasing power. Its power scanning method can be considered to be similar to the method in the embodiment 1. The final step S8 is also similar to that in the embodiment 1 and explanation thereof is omitted.

Although the above explanation has been made in the above embodiment in connection with the rewritable disc as an example, the same can holds true even for a disc writable only once. Though not specifically illustrated, when items relating to the erasing operation are omitted and the space power is substituted for the erasing power, similar effects can be obtained.

In the case of a BD-R disc as an example of the only-once-writable disc, the space power is given even to a space area for preheating the area to form a recording mark. With respect to the laser power to be used upon recording, since the ratio between the recording and space powers influences its recording performance. Thus at the first stage, recording power scan is carried out with the fixed ratio between the recording and space powers as in the BD-RE disc. In the case of the castle type recording waveform, a ratio of the middle power to the recording power is similarly fixed. The only-once-writable disc is largely different from the rewritable disc in that erasing is unnecessary and the need of paying consideration to the influences caused by the incomplete erasing can be eliminated. As a matter of course, unlike the BD-RE disc, since an area for simulation write cannot be continuously used, it is desirable to sequentially shift the simulation write area.

Embodiment 3

An embodiment 3 is based on FIG. 6. The drawing is a flow chart relating to the rewritable optical disc as has been mentioned earlier. In some rewritable optical discs, it becomes difficult to determine the rewrite performance because the rewritable performance varies from disc to disc. In the present embodiment, consideration is paid to such different rewrite characteristics among rewritable optical discs.

In the present embodiment, though not specifically illustrated, only the step S7 is modified. It has been assumed in the embodiment 1 that the same area is recorded at least twice with the same erasing power. In the present embodiment, the erasing power used for the second recording operation is made to be smaller than the erasing power used for the first recording operation. In such a rewritable optical disc such as a BD-RE disc, when rewriting operation is carried out with the same recording power and erasing power, the performance can be secured relatively without any trouble. However, when the recording is carried out previously with a high power and thereafter the recording is carried out with a lower power, incomplete erasing may take place with a high possibility and thus the rewrite performance cannot be sufficiently secured. When compared with the evaluation with the same erasing power, performance comparison can be made with a better sensitivity.

In accordance with the present invention, since the optimum point is found with a low recording power, data area recorded with a high power and a power calibration area can be prevented from being destroyed.

Further, since only a small usage area is required as a once simulation write area, a use frequency of a single recording medium can be increased. In addition, since a stable recording performance can be secured, the reliability of the information recording device can be increased.

The recording and reproducing method and the recording and reproducing apparatus in accordance with the present invention have been detailed in connection with the embodiments. However, the present invention is not limited to the above embodiments, and can include various types of improvements and modifications in the scope of claims without departing from the sprit of the present invention.

In the aforementioned embodiments, explanation has been made in connection with the BD-RE and BD-R discs as the recording media to be recorded or reproduced by the recording and reproducing method and the recording and reproducing apparatus in accordance with the present invention. However, the present invention is not limited to the above examples, but may be applied to various types of media which determine the laser power through the simulation write function. Further, the present invention can be applied even to a recording medium having a multiplicity of layers including 2 or more recording/reproducing layers.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing method for an information recording medium having a simulation write area, comprising:
a step of erasing said simulation write area with an initial erasing power;
a first simulation write step of setting a ratio between a recording power and an erasing power, a bottom power, and a multi-pulse width at fixed values, and recording first simulation write data on said simulation write area using the recording power and the erasing power as parameters;
a step of reproducing said first simulation write data and calculating a first recording power on the basis of an evaluation index relating to a signal level of a reproduction signal;

a second simulation write step of setting said first recording power, a first erasing power corresponding to said first recording power, and a first bottom power at fixed values, and recording second simulation write data on said simulation write area;

a step of reproducing said second simulation write data and calculating a first multi-pulse width corresponding to an optimum evaluation index;

a step of executing said first simulation write step when a difference is found between said first multi-pulse width and said multi-pulse width used in said first simulation write step, and setting said first recording power and said first bottom power as fixed values and recording third simulation write data on said simulation write area using the erasing power as a parameter when the difference is not found between said first multi-pulse width and said multi-pulse width used in said first simulation write; and a step of reproducing said third simulation write data and calculating an erasing power corresponding to the optimum evaluation index.

2. The recording and reproducing method according to claim 1, wherein said third simulation write data is recorded at least twice on a same area.

3. The method according to claim 1, further comprising a step of executing an operation of changing stepwise the erasing power at least twice on a same area under a same condition.

4. The method according to claim 1, further comprising:
a step of executing first an operation of changing stepwise the erasing power; and
a step of executing for the second time an overwrite operation at least once with a less erasing power than the stepwise-changed erasing power of the first time.

5. The method according to claim 1, wherein the evaluation index includes jitter and the calculation is made for minimizing the jitter.

6. The method according to claim 1, wherein the evaluation index includes a modulation degree or a beta and an index is a target value.

7. A recording and reproducing method for an information recording medium having a simulation write area, comprising:
a step of erasing the simulation write area of said information recording medium with an initial erasing power;
a first simulation write step of setting a ratio between a recording power and a middle power, a ratio between an erasing power and the middle power, and a bottom power at fixed values, and recording first simulation write data on said simulation write area using the recording power, the erasing power, and the middle power as parameters;
a step of reproducing said first simulation write data and calculating a first recording power on the basis of an evaluation index relating to a signal level of a reproduction signal;
a second simulation write step of setting said first recording power, a first erasing power and a first bottom power corresponding to said first recording power at fixed values, and recording second simulation write data on said simulation write area;
a step of reproducing said second simulation write data and calculating a first middle power corresponding to an optimum evaluation index;
a step of executing said first simulation write step when a difference is found between said first middle power and said middle power used in said first simulation write step, and setting said first recording power and said first bottom power fixed as values and recording third simulation write data on said simulation write area using the erasing power as a parameter when the difference is not found between said first middle power and said middle power used in said first simulation write step; and a step of reproducing said third simulation write data and calculating an erasing power corresponding to the optimum evaluation index.

8. The recording and reproducing method according to claim 7, wherein said third simulation write data is recorded at least twice on a same area.

9. The recording and reproducing method according to claim 7, wherein said third simulation write data is recorded at least twice on a same area.

10. The method according to claim 7, further comprising a step of executing an operation of changing stepwise the erasing power at least twice on a same area under a same condition.

11. The method according to claim 7, further comprising a step of executing first an operation of changing stepwise the erasing power and a step of executing for the second time an overwrite operation at least once with a less erasing power than the stepwise-changed erasing power of the first time.

12. The method according to claim 7, wherein the evaluation index includes jitter and the calculation is made for minimizing the jitter.

13. The method according to claim 7, wherein the evaluation index includes a modulation degree or a beta and an index is a target value.

14. A recording and reproducing method for an information recording medium having a simulation write area, comprising:
a first simulation write step of setting a ratio between a recording power and a space power, a bottom power, and a multi-pulse width at fixed values, and recording first simulation write data on said simulation write area using the recording power and the space power as parameters;
a step of reproducing said first simulation write data and calculating a first recording power on the basis of an evaluation index relating to a signal level of a reproduction signal;
a second simulation write step of setting said first recording power, a first space power and a first bottom power corresponding to said first recording power at fixed values, and recording second simulation write data on said simulation write area using the multi-pulse width as a parameter;
a step of reproducing said second simulation write data and calculating a first multi-pulse width corresponding to an optimum evaluation index;
a step of executing said first simulation write step when a difference is found between said first multi-pulse width and said multi-pulse width used in said first simulation write step, and setting said first recording power and said first bottom power as fixed values and recording third simulation write data on said simulation write area using the space power as a parameter when the difference is not found between said first multi-pulse width and said multi-pulse width used in said first simulation write step; and
a step of reproducing said third simulation write data and calculating a space power corresponding to the optimum evaluation index.

15. The recording and reproducing method according to claim 14, wherein said third simulation write data is recorded at least twice on a same area.

16. The method according to claim 14, wherein the evaluation index includes jitter and the calculation is made for minimizing the jitter.

17. The method according to claim 14, wherein the evaluation index includes a modulation degree or a beta and an index is a target value.

18. A recording and reproducing method for an information recording medium having a simulation write area, comprising:
- a first simulation write step of setting a ratio between a recording power and a middle power, a ratio between a space power and a middle power, and a bottom power at fixed values, and recording first simulation write data on said simulation write area using the recording power, the space power, and the middle power as parameters;
- a step of reproducing said first simulation write data and calculating a first recording power on the basis of an evaluation index relating to a signal level of a reproduction signal;
- a second simulation write step of setting said first recording power, a first space power and a first bottom power corresponding to said first recording power at fixed values, and recording second simulation write data on said simulation write area using the middle power as a parameter;
- a step of reproducing said second simulation write data and calculating a first middle power corresponding to an optimum evaluation index;
- a step of executing said first simulation write step when a difference is found between said first middle power and a middle power used in said first simulation write step, and setting said first recording power and said first bottom power as fixed values and recording third simulation write data on said simulation write area using the spacer power as a parameter when the difference is not found between said first middle power and said middle power used in said first simulation write step; and
- a step of reproducing said third simulation write data and calculating a space power corresponding to the optimum evaluation index.

19. The recording and reproducing method according to claim 18, wherein said third simulation write data is recorded at least twice on a same area.

20. The method according to claim 18, wherein the evaluation index includes jitter and the calculation is made for minimizing the jitter.

21. The method according to claim 18, wherein the evaluation index includes a modulation degree or a beta and an index is a target value.

* * * * *